No. 617,461.  
J. W. CLICK.  
CHURN DASHER.  
(Application filed Mar. 8, 1898.)  
Patented Jan. 10, 1899.
(No Model.)
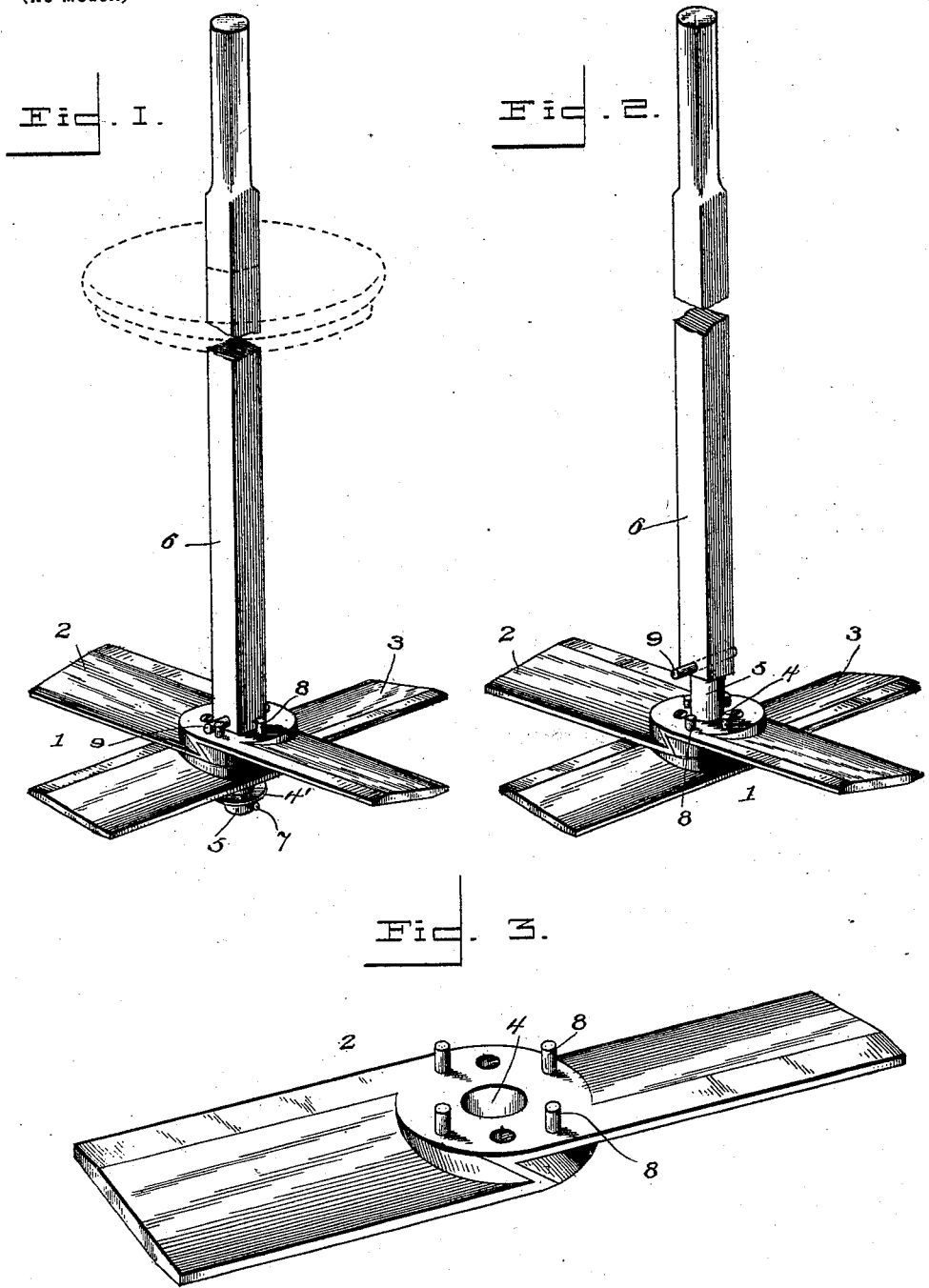

UNITED STATES PATENT OFFICE.

JOHN W. CLICK, OF BRIDGEWATER, VIRGINIA, ASSIGNOR OF ONE-HALF TO J. E. SANGOR, OF SAME PLACE.

CHURN-DASHER.

SPECIFICATION forming part of Letters Patent No. 617,461, dated January 10, 1899.

Application filed March 8, 1898. Serial No. 673,038. (No model.)

*To all whom it may concern:*

Be it known that I, JOHN W. CLICK, a citizen of the United States, residing at Bridgewater, in the county of Rockingham and State of Virginia, have invented certain new and useful Improvements in Churn-Dashers; and I do declare the following to be a full, clear, and exact description of the invention, such as will enable others skilled in the art to which it appertains to make and use the same.

The invention has relation to churn-dashers.

The object is to provide a simple, durable, and inexpensive churn-dasher which will on the downstroke be locked against rotation, thereby cutting direct through the cream and forcing the air to the bottom of the churning vessel, whereby the air and cream are incorporated and the impurities contained in the cream thrown off before it is formed into butter, and on the upstroke be released and permitted to rotate rapidly as the dasher-rod is drawn upward, cutting its way to the top of the cream and making the operation of churning light and easy, as the volume of cream is not lifted by the dasher.

With this object in view the invention consists in certain features of construction and combination of parts, which will be hereinafter fully described and claimed.

In the accompanying drawings, Figure 1 is a perspective view of my improved churn-dasher, showing it connected to the dasher-rod and the relation of parts when the dasher is on its downstroke. Fig. 2 is a similar view showing the relation of the parts when the dasher is on its upstroke, and Fig. 3 is a detail perspective view of one of the dasher-blades.

In said drawings, 1 denotes the dasher, consisting of blades 2 and 3, crossing each other and fixed together. These blades are provided with cylindrical central apertures 4, through which projects the end 5 of a dasher-shaft 6, which is preferably polygonal in cross-section and is adapted to reciprocate vertically through the lid of the churn and have no rotary movement. A washer 4' is placed on the lower cylindrical end of the dasher-rod, and a pin 7 is passed through said end and holds the washer in place. The length of the cylindrical portion 5 is greater than the combined thicknesses of the dashers at the point of intersection, thereby permitting a slight independent vertical movement of the dasher-rod with respect to the dasher.

8 denotes studs projecting vertically from one of the dasher-blades around its central aperture and adapted to be engaged by a transverse pin 9, secured to the dasher-rod at a point above the cylindrical portion thereof.

In operation as the dasher-rod is thrust downward the pin 9 will engage the pin 8, thereby locking the dasher against rotary motion and causing the dasher to cut direct through the cream and force the air direct to the bottom of the churning vessel, thoroughly incorporating the air and cream and throwing off all impurities contained in the cream before it is formed into butter. On the upstroke of the dasher-rod the pin 9 will be disengaged from the pin 8, thus allowing the volume of cream as the dasher-rod is being thrust upward to impart to the dasher a rotary motion, thereby allowing the dasher to be drawn more easily through the cream to the top thereof as the cream slides off the beveled edges of the blades, thus lessening the volume to be lifted, and consequently the labor expended in the operation of churning.

Although I have specifically described the construction and relative arrangement of the several elements of my invention, I do not desire to be confined to the same, as such changes or modifications may be made as clearly fall within the scope of my invention without departing from the spirit thereof.

I am aware of the fact that it is not new, broadly, to provide a churn-dasher which on the downward stroke will be locked against rotation and which on the upward stroke will be free to revolve upon its axis; but

What I claim, and desire to secure by Letters Patent, is—

The combination with the dasher-rod having cylindrical upper and lower ends and an intermediate rectangular section, a dasher loosely mounted on the lower cylindrical end of said dasher-rod and a stationary churn-cover formed with a rectangular guide-orifice to engage the intermediate rectangular section of said dasher-rod, substantially as shown and described.

In testimony whereof I have hereunto set my hand in presence of two subscribing witnesses.

JOHN W. CLICK.

Witnesses:
JAS. R. SHIPMAN,
S. H. W. BYRD.